United States Patent

[11] 3,587,180

[72] Inventor Hubert Richt
 Socking, Germany
[21] Appl. No. 847,169
[22] Filed Aug. 4, 1969
[45] Patented June 28, 1971
[73] Assignee Sueddeutsche Mechanische Werkstatten
 Wolf FRHR. von Hornstein
 Kommanditgesellschaft
 Munich, Germany

[54] EDUCATIONAL DEVICE FOR PROGRAMMED INSTRUCTION
 5 Claims, 5 Drawing Figs.
[52] U.S. Cl. .................................................. 35/35c, -
 179/100.2MI
[51] Int. Cl. .................................................. G09b 5/04,
 G11b 5/86
[50] Field of Search ........................................ 35/8 (A),
 35 (C); 179/100.2 (M1), (S)

[56] References Cited
UNITED STATES PATENTS
3,269,033 8/1966 Redfield et al. ............... 35/35C Primary Examiner—Wm. H. Grieb
Attorney—Nolte & Nolte ABSTRACT: To reinforce the learning process, particularly in respect to a foreign language, a student listens to the playback of instructional material recorded on tape and subsequently records his response thereto on appropriate areas of the tape. If the instructional material is stored on and played back from one track of a multiple-track tape fed in one direction through a bidirectional tape recorder, and if the student's response is recorded on another of the tracks of the tape in the opposite direction, reversal of the direction of movement of the tape after each operation represents cyclical motion which may be repeated as often as desired. The reversal of the tape direction is automatic and controlled by cue marks recorded adjacent to the entries. The length of each cycle, and the number of repetitive cycles can be regulated manually as well as automatically.

INVENTOR
HUBERT RICHT
BY
Nolte & Nolte
ATTORNEY

INVENTOR
HUBERT RICHT
BY
Nolte & Nolte
ATTORNEY

EDUCATIONAL DEVICE FOR PROGRAMMED INSTRUCTION

BACKGROUND OF THE INVENTION

The use of tape recorders for programmed instruction, and particularly for instruction in a foreign language is well known. The subject matter is presented as a series of individual program steps, and the student progresses from step to step by pacing himself in a manner and at a rate of his own selection. After he has listened to the playback of the instructional text, the student responds by repeating words or phrases, or by answering questions set forth in the text. There is no limit to the number of times a recording may be played back, nor to the number of responses which can be recorded, erased, and replaced by new responses. The student's final response is retained on the tape so that the teacher can check his performance.

This method of teaching by programmed instruction requires that a large number of relatively short program steps, and of students' responses thereto, be stored on the tape. The repetition rate for each program step must be variable because of the wide difference in the learning ability, prior knowledge, interest and preferences of individual students. Furthermore, the tape recorder must be simple in operation so that the student is not unduly distracted from the learning process.

DESCRIPTION OF PRIOR ART

Several types of tape recorders are known which are adapted for programmed instruction, particularly for instruction in a foreign language, and which attempt to satisfy the various demands of the users.

In one conventional device the student is required to listen to part of the program and then to press a button for rewinding the tape. While the tape runs back at constant high speed the playback amplifier remains in the ON position. With some practice the student learns to find the beginning of the preceding program step; when that point on the tape is reached, he releases the button, whereupon the tape recorder resumes forward operation at normal speed to repeat the playback of the predetermined program. This process can be repeated as often as desired.

Though it appears to be simple, several drawbacks are implicit in this type of device. One drawback is that the student who must manipulate the tape recorder is distracted from his real task of learning. Another drawback is the disturbing noise level of a tape recorder running in reverse at high speed. In addition, there is the loss of time during the rewind operation.

In another conventional arrangement which is based on the method described heretofore, but which is easier to operate, one track of a multiple-track tape is reserved for control impulses. The impulses are recorded on the tape immediately before and after each program step, respectively after the blank area which follows each program step. The impulses are adapted to actuate the mechanism which drives the tape on one direction for the playback of the recorded instructions, or in the reverse direction for rewinding at constant high speed. Through this arrangement the programmed steps can be played back automatically as often as desired without any interference on the part of the student. However, the longer the individual program steps, the greater the waste of time during the rewind operation. Besides, it is uneconomical to save a special track for control impulses.

In another known device a short endless tape loop is combined with a finite tape, each having multiple tracks. The endless loop carries a plurality of recorded programs, whereas a corresponding number of tracks on the finite tape are provided for the entry of the students's responses. The complicated structure of the tape recorder which is required for the dual tapes is an adverse feature of the arrangement. Also, the format of the endless loop requires that all the programs recorded thereon be of approximately the same length. This means that in preparing the subject matter to be taught, the prime consideration must be to keep within the time limit set by the length of the endless loop, which narrows the teacher's choice and structure of the material.

SUMMARY OF THE INVENTION

The present invention relates to an educational device for programmed instruction and more particularly, for instruction in a foreign language, comprising recording and playback means which include a multiple-track magnetic tape, having provided thereon audible instructional material relating to the subject being taught, and proximate to the recorded portions blank areas on which a student's responses are to be recorded.

It is, therefore, an object of the present invention to provide an educational device for programmed instruction with improved recording and playback means.

Another object is to provide a means for programmed instruction which is educationally sound.

A further object is to provide a teaching and learning method which contributes to the development of the technology of education.

These objects and others which will become apparent hereinafter are attained, in accordance with the present invention, by a tape recorder or a similar tape transport mechanism which is operable in either direction, and a multiple-track tape capable of being recorded and played back bidirectionally. The tape direction can be changed manually or by automatic switches, and any recording may be played back as often as desired without intermittent pauses. In this respect, a bidirectional tape resembles an endless loop. A fully recorded tape may be segmented into portions of different length, each of which can be played back as often as the listener wants to hear a selected program step. This feature is of particular advantage for a foreign language program because it enables the student to go over each program step as often as necessary to master the material. The teacher can construct the program in accordance with the most effective teaching methods since he is not limited in the length of each program step. The student also benefits because he does not have to suffer through the monotony of uniformly long program steps.

According to one preferred embodiment of the invention, the multiple-track tape comprises blank areas on which the student records his responses to the instructional text—either by repeating and pronouncing words or phrases, or by answering recorded questions. Programmed instructions also may be recorded on the blank areas. Manual or automatic switching of the tape direction permits the student to listen over and over again to the same text and gives him an opportunity to respond at each rerun of the tape.

If the tape has two tracks the program steps are recorded on one of the tracks and the blank areas for the student's responses are on the other track. The tracks are recorded, respectively read, in opposite directions relative to each other. On a four-track tape there is an even division between tracks recorded, respectively read in the forward direction and in the reverse direction. A program recorded on one track in the forward direction, for example, may be transferred by playback, to the other track adapted for forward recording. Each program step is followed by a pause during which the student may record his responses in the same direction as the recorded text, although on another track. Following the response the tape direction is reversed, and a new program step is presented on one of the two reverse tracks. The new step may be a continuation of the previously presented material, or it may be a repetition of old material. When it is played back it may be simultaneously recorded on the blank areas of the second reverse track. The playback of the new program step is followed by another pause for recording the student's responses on the blank areas of the second reverse track, and after this has been completed, the tape direction is again switched to forward operation to repeat the cycle. In one preferred embodiment of the invention the student's responses are automatically erased after each cycle, so that new responses may be recorded on the respective blank areas. The cycling may be continued until the student is satisfied with his final standard of performance which he leaves on the tape to be checked by the teacher.

In another preferred embodiment the reversal of the tape is initiated by cue marks provided at the end of each recorded program step, respectively, at the end of the pause which follows each program step. The cue marks which relieve the student from the effort of manipulating the tape recorder may be signals of the form of sine waves; these are scanned by the record head or playback head of the apparatus, selectively processed and transmitted to trigger electronic or electromechanical switches for changing the direction of the tape run. With the aid of such cue marks each program step is automatically repeated, so that the student can concentrate on learning. For special purposes it may be advantageous to provide separate tracks for the cue marks, even though this is an uneconomical use of the tape. The cue marks may be audible signals, that is, their frequency may be within the audible frequency range. Cue marks of different frequency may be recorded on different or the same tracks, so that the student recognizes from the sound the end of a pause or the direction of the tape run. The cue marks may be recorded and scanned by separate record heads, or by the tape record heads. The student himself may actuate special switches, for example by pressing a key, whereby cue marks are recorded at selected locations on the tape. This allows him to choose the length of a cycle and, thereby, the particular program steps which he desires to have repeated.

In yet another preferred embodiment successive cue marks are counted by electric, electronic or other mechanisms, to identify a position on the tape. For example, if a student has not fully completed a program on the tape and wishes to continue at a later time where he left off, he may run the tape forward at high speed until a counter indicates the required number of cue marks. The counting may be fully automatic; for example, a key may be depressed in a preselector which registers the cue marks to be counted and which engages a drive mechanism for moving the tape at high speed in either direction to the selected cue marks, and for decelerating the tape at this point to normal speed. The cue marks are particularly suitable as substitutes for the position indicators which are usually provided on conventional tape recorders to identify the beginning of a special recording on the tape, and to assist in search functions.

The present invention also takes into account the different learning capacity of individual students, by permitting arbitrary termination of the continuous repetition of a program step. Students who learn faster than others, and who will be bored by unnecessary repetition of the program steps, may end a tape cycle by actuating a stepping device which advances the tape to the next program step which may be, for example, a continuation of the preceding step. The tape can be advanced by press pressing a key which deactivates the cue marks Individual control of the number of repetitive cycles is desirable also insofar as there is in general, variation in the degree of difficulty of the program steps, so that it would be unwise to predetermine a fixed number of repeat cycles.

In a further preferred embodiment of the invention the number of repetitive cycles can be preselected by the student or by automatic controls connected, for example, to the mechanism which counts the cue marks in one tape direction. Once the selected number of cue marks has been registered, the tape is advanced automatically to the following program step and resumes another cycling operation in respect thereto. An arrangement of this type is suitable, for example, for examinations, where each student is to be given the same amount of time to answer each question.

BRIEF DESCRIPTION OF THE DRAWING

The above and other objects, features and advantages of the present invention will become more readily apparent from the following description, reference being made to the accompanying drawing in which.

DESCRIPTION OF THE PREFERRED EMBODIMENTS

Figure 1:
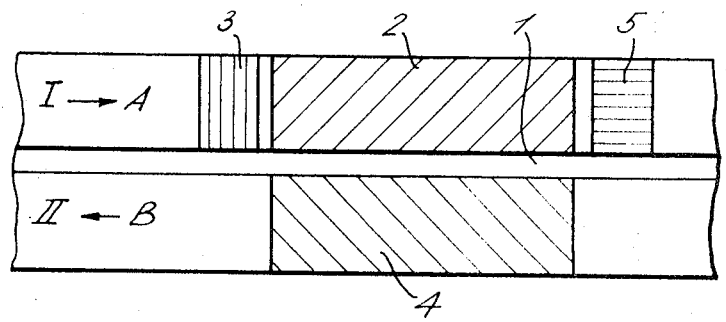
FIG. 1 is a fragmentary plan view of a two-track tape recorded by a bidirectional tape recorder.

Referring to FIG. 1, there is shown a portion of a magnetic tape 1 comprising a pair of substantially parallel tracks I and II extending generally lengthwise on the tape strip. A program 2 has been recorded on track I of the tape 1 while the latter was driven in the direction indicated by arrow A. The recording area of tracks I and II may be a layer of a suitable magnetizable metal oxide on which a message can be recorded in a manner well known to one skilled in the art. The program 2 is bracketed by cue marks 3 and 5 respectively, which are signals of a predetermined frequency recorded at selected locations. Cue mark 5 is at the beginning of the program 2 as seen in the direction of arrow A in which the tape is intended to be fed past a playback head (not shown) for reproduction of the program, and cue mark 3, which may be, for example, a 3,000 Hz. sound, is at the end of the program when the latter is played back. The arrival of cue mark 3 under the playback head triggers a switch which shifts the direction of the tape and causes track II to advance past a record head (not shown) in the direction of arrow B. Track II which comprises blank areas is adapted to record the student's responses 4 thereon by actuation of a microphone and associated circuits until cue mark 5 is reached which may be, for example, a 1,000 Hz. sound. Cue mark 5 is adapted to trigger a switch which reverses the tape direction and causes program 2 to be played back again. In this way program 2 and response 4 can be repeated as often as desired without any intervention on the part of the student. The record head erases previously recorded messages on track II during each cycle, so that new messages or responses can be entered in the respective areas. Each cycle is intended to reinforce the learning process and to improve the student's standard of performance. If the student wants to listen to his recorded response 4, he may switch on a tape recorder head coordinated with track II, which plays back first the recorded program 2, and then the recorded response 4. During the recording or playback of response 4 the speaker of the tape recorder is usually disconnected from the head which scans track I, though it may be connected thereto by the selection of appropriate cue marks. When the student wants to progress from program 2 to a following program step on another part of the tape (not shown), he may deenergize the cue marks 3, 5 by pressing the key of a stepping device (not shown) so that tape 1 advances in the direction of arrow A.

Figure 2:
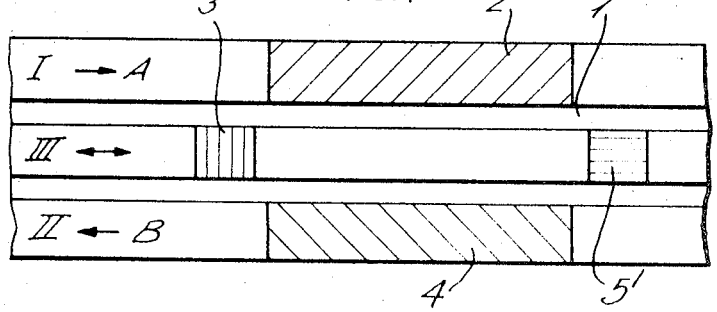
FIG. 2 is a fragmentary plan view of a three-track tape recorded by a bidirectional tape recorder.

FIG. 2 shows a three-track tape 1 on which program 2 is recorded on track I in the direction of the arrow A, and on which track II comprises blank areas on which the student's responses 4 are to be recorded when the tape moves in the direction of the arrow B. Cue marks 3' and 5' are recorded on track III parallel with and intermediate tracks I and II. Track III may be recorded and read in both directions so that the arrival of the tape at either of the cue marks 3' and 5' under the tape recorder head actuates a switching device which changes the tape direction. The cue marks can be deenergized or erased by conventional means, and new cue marks may be recorded at selected locations on the tape, as is well known. The cue marks can be produced, for example, by a sound generator associated with the tape recorder; they may be recorded on the tape by a head coordinated with track III.

Figure 3:
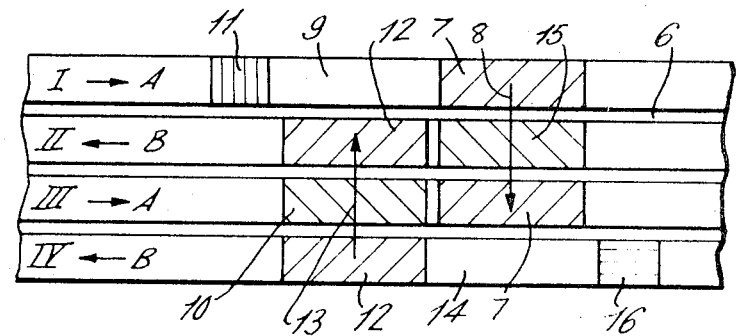
FIG. 3 is a fragmentary plan view of a four-track tape recorded by a bidirectional tape recorder.

The tape 6 shown in FIG. 3 comprises four tracks, of which tracks I and III can be recorded, respectively played back only in the direction of arrow A, whereas tracks II and IV can be recorded, respectively played back only in the direction of arrow B. Normally, tracks I and IV are adapted for playback only, whereas tracks II and III are adapted for recording only, though they may be switched to playback by appropriate switching means. In the illustration of FIG. 3 a program 7 stored on track I is played back in the direction of arrow A. During the playback it may be simultaneously recorded on track III as indicated by arrow 8, while track III is fed past a record head. The transfer of one program from one track to another during playback may be advisable for special purposes. The end of the playback of program 7 is followed by a pause 9 comprising a blank area on track I. During pause 9 the student enters his response 10 on track III in the direction of arrow A. The pause 9 on track I is terminated by a cue mark II which may be, for example, a sine wave of 3,000 Hz. frequency. The arrival of cue mark 11 under the playback head coordinated with track I triggers by appropriate circuitry switching means to reverse the tape direction from A to B. The shift causes program 12, previously recorded on track IV to advance under the playback head associated with track IV, whereby reproduction of this program begins. Program 12, which may be a continuation of program 7 on track I or, alternately, the presentation of new material, can be recorded, during playback, on track II as indicated by arrow 13. Program 12 on track IV is followed by pause 14 during which the student may record his response 15 to program 12 on track II. A cue mark 16, which may be a sine wave, for example, of 1,000 Hz. frequency, subsequent to pause 14 on track IV causes another reversal of the tape direction, whereupon program 7 is presented again. During each cycle the student's responses are erased as new responses are recorded in place thereof. If the student wants to listen to programs 7 and 12 and to his responses 10 and 15 relative thereto, he may prevent erasure by moving a switch to PLAYBACK, which causes all the recordings on the four tracks to be reproduced in the proper sequence. From the playback cycle too the student may proceed to the next cycle by pressing a key of a stepping device which deenergizes the cue marks and permits the tape 6 to advance.

Figure 4:
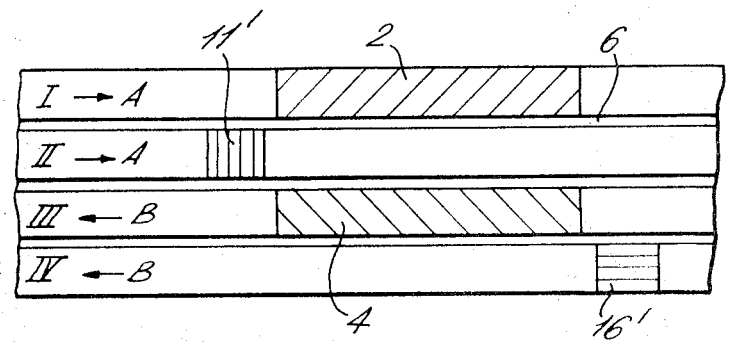
FIG. 4 is a fragmentary plan view of a four-track tape on which two tracks are reserved foe cue marks.

The four-track tape 6 shown in FIG. 4 is similar to the two-track tape 1 of FIG. 2 insofar as separate tracks are reserved for the cue marks. Program 2, which has been previously recorded on track I, is adapted to be played back in the direction of arrow A, and the response 4 thereto is adapted to be recorded on track III in the opposite direction as indicated by arrow B. The tracks are divided into two groups, one of which comprises tracks I and II, and the other of which comprises tracks III and IV. Each of the groups is scanned by a head associated therewith. The arrival of the cue marks 11' or 16' under the appropriate heads actuates a reversal of the tape direction, as described heretofore. In this embodiment of the invention, as well as in the embodiments illustrated in FIGS. 1, 2 and 3, the cue marks may be shifted to another location on the tape, either manually or by automatic controls.

The advantage of a four-track tape with two separate tracks for the cue marks according to FIG. 4, over a three-track tape with one separate track for the cue marks as shown in FIG. 2 is that four-track tapes are well known and are commercially available, whereas the record head of conventional tape recorders would have to be redesigned if three-track tapes of the described structure were to be used.

Figure 5:
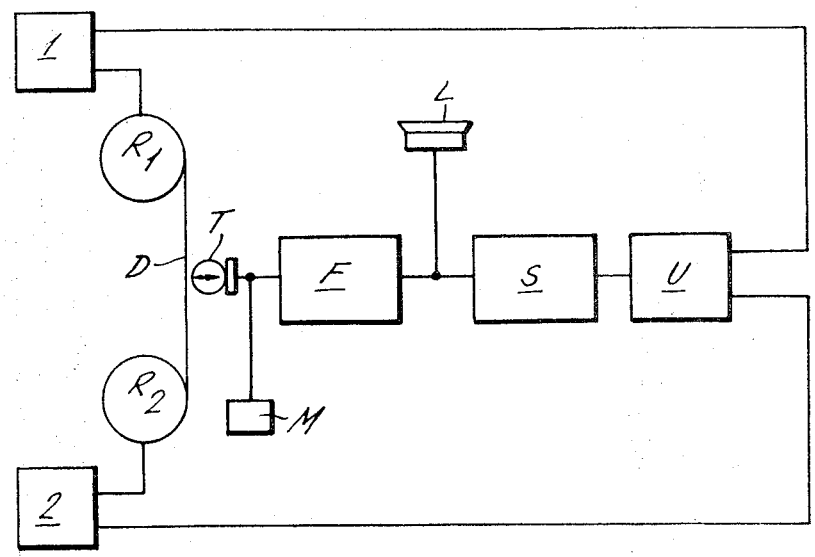
FIG. 5 is a simplified diagram of the electric circuit and components for the operation of the educational device according to the present invention.

FIG. 5 illustrates a block diagram including some of the components of the bidirectional tape recorder though which the tape is fed. Wound motors 1 and 2 are adapted to drive a pair of tape reels $R_1$ and $R_2$ on which tape D is wound. Either of the two reels $R_1$ and $R_2$ is adapted to serve as a takeup reel or as a supply reel for tape D, depending on the direction of movement of the tape as regulated by switching means U. The assembly also includes a conventional head T past which tape D is fed for recording a message thereon, or for playing back a previously recorded message. Head T is connected to an amplifier F which, in turn, is connected to a loudspeaker L by which the student may listen to the playback of tape D. A microphone M and associated circuitry are also part of the assembly and are adapted to be actuated when a message is to be recorded on tape D. A selective amplifier S is connected in series with amplifier F and is tuned so that only signals of a predetermined frequency are passed on to switching means U. The signals, representing cue marks recorded on tape D in selected locations, have preferably a frequency above the frequency range of the loudspeaker L so that they can be distinguished from other signals recorded on the tape. The switching means U is adapted to respond to cue marks of predetermined frequency or, alternately, to cue marks of predetermined temporal length, by initiating a reversal of the tape direction, or example, by energizing, respectively deenergizing either of the wound motors 1, 2 driving the tape reels $R_1 R_2$.

I claim:

1. An educational device for programmed instruction of students, comprising a tape recorder which includes at least one head; a magnetic tape; means for feeding said tape past said head in a first direction and also in a second direction opposite to said first direction; and four substantially parallel tracks on said tape, extending longitudinally along said tape, the first of said tracks comprising intermittent instructional recordings adapted to be played back during movement of said tape past said head in said first direction, the second of said tracks comprising intermittent instructional recordings adapted to be played back during movement of said tape past said head in said second direction, the third of said tracks comprising blank areas adapted to record students' responses to said instructional recordings on said first track during movement of said tape past said head in said first direction, and the fourth of said tracks comprising blank areas adapted to record students' responses to said instructional recordings on said second track during movement of said tape past said head in said second direction.

2. An educational device as defined in claim 1 wherein said first track and said second track are adapted to play back recordings provided thereon during movement of said tape, and said third track and said fourth track are adapted to record information and to play back said information during movement of said tape.

3. An educational device as defined in claim 1 comprising means for recording said instructional recordings provided on said first track during playback thereof synchronously on coordinated blank areas provided on said third track, and means for recording said instructional recordings provided on said second track during playback thereof, synchronously on coordinated blank areas provided on said fourth track.

4. An educational device as defined in claim 1 wherein said first track comprises blank areas subsequent said instructional recordings and of substantially equal length therewith, each of said blank areas being coordinated with one of said blank areas provided on said third track for entry thereon of said student's responses to said instructional recordings, and wherein said second track comprises blank areas subsequent said instructional recordings and of substantially equal length therewith, each of said blank areas being coordinated with one of said blank areas provided on said fourth track for entry thereon of said student's responses to said instructional recordings.

5. An educational device for programmed instruction of students, comprising a bidirectional tape recorder including at least one head, a magnetic tape, means for feeding said tape past said head, said tape having four substantially parallel tracks extending longitudinally along said tape, the first of said tracks comprising instructional recordings adapted to be played back during movement of said tape past said head in a first direction, the second of said tracks comprising instructional recordings adapted to be played back during movement of said tape past said head in a second direction, the third of said tracks comprising blank areas adapted to record students' responses to said instructional recordings on said first track during movement of said tape past said head in said first direction, and the fourth of said tracks comprising blank areas adapted record students' responses to said instructional recordings on said second track during movement of said tape past said head in said second direction.